United States Patent [19]

Hackett

[11] 3,958,111
[45] May 18, 1976

[54] REMOTE DIAGNOSTIC APPARATUS
[75] Inventor: John Arthur Hackett, Howell Township, Monmouth County, N.J.
[73] Assignee: Bell Telephone Laboratories, Incorporated, Murray Hill, N.J.
[22] Filed: Mar. 20, 1975
[21] Appl. No.: 560,316

[52] U.S. Cl. ............... 235/153 AK; 340/146.1 BE; 340/172.5; 179/175.2 R
[51] Int. Cl.² ........................................ G06F 11/00
[58] Field of Search ............. 235/153 AK, 153 AC, 235/153 AE; 340/146.1 BE, 172.5; 179/175.2 R, 175.2 C

[56] References Cited
UNITED STATES PATENTS

| | | | |
|---|---|---|---|
| 3,409,877 | 11/1968 | Alterman et al. | 235/153 AK |
| 3,557,315 | 1/1971 | Kobus et al. | 235/153 AK |
| 3,692,989 | 9/1972 | Kandiew | 235/153 AK |
| 3,898,621 | 8/1975 | Zelinski et al. | 340/172.5 |
| 3,908,099 | 9/1975 | Borbas et al. | 179/175.2 R |

Primary Examiner—Charles E. Atkinson
Attorney, Agent, or Firm—J. W. Falk

[57] ABSTRACT

A diagnostic controller is situated with a pair of duplicated logic units which themselves are remotely situated in relation to a controlling data processing unit. A distinct data path is provided between each of the remote logic units and the data processing unit for the conveyance of control information therebetween. When a remote logic unit appears to malfunction, the data processing unit takes the associated data path out-of-service and transmits commands over the in-service data path to start the diagnostic controller. Responsive to these commands, the diagnostic controller autonomously simulates data received over the out-of-service data path and applies the simulated data to the suspect remote logic unit. Results from this suspect unit are compared by the diagnostic controller with anticipated results wherein a mismatch indicates an actual malfunction in the suspect unit. Any detected malfunctions are reported to the data processing unit over the in-service data path.

19 Claims, 12 Drawing Figures

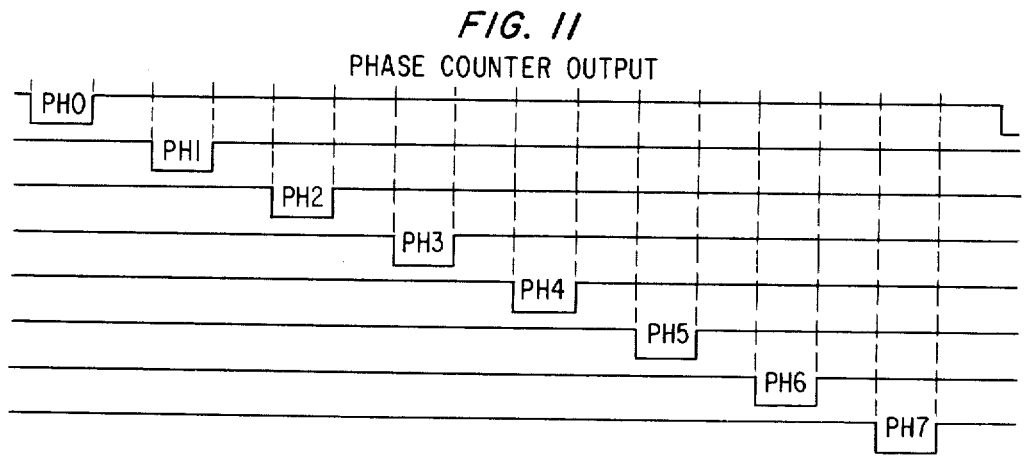

REMOTE DIAGNOSTIC APPARATUS

FIELD OF THE INVENTION

This invention pertains to equipment for performing diagnostic operations on data processing apparatus. Even more particularly, this invention relates to diagnosing duplicated processing equipment utilized in the provision of communication service and remotely situated in relation to a controlling data processing unit.

BACKGROUND OF THE INVENTION AND PRIOR ART

In the past it has not been economically feasible to situate certain sophisticated communication systems in sparsely populated areas because of insufficient demand for service. For example, automated operator service has generally been provided only in highly populated areas. However, very recently it has become feasible to provide such service to rural communities through the provision of relatively small remote communication systems which are controlled by a single central communication system including a large data processing unit.

Although these small communication systems are remotely situated in relation to the central unit, they must still provide high quality reliable service. Reliability is essential so that customers served by these systems will not experience any inconvenience even when equipment troubles develop in the communication paths between the remote systems and the central system, or in the remote systems themselves. To meet this high standard, major functional equipment will often be duplicated. For example, each remote system may itself be duplicated with duplicated data paths to the central system. Each data path may even have sufficient information handling capacity to fully handle the normal data load between the remote system and the central system.

In one prior art system, each duplicated system half of a remote system independently generated reports and independently communicated such reports to the central system over a dedicated data path. The central system would compare the reports from each half with a mismatch indicating a potential malfunction at the remote location. It is apparent that the malfunctioning remote system half must be identified as quickly as possible to maintain system integrity. If maintenance personnel are stationed at the remote system, they can institute manual diagnostic routines to identify any malfunctions. However, normally, it is not economically feasible to provide highly skilled maintenance personnel at each remote location. Accordingly, the trend today is toward centralized maintenance, and in this prior art system the central system itself was adopted to perform all diagnostic routines on the remote system. This was accomplished by sending diagnostic commands over the data paths and waiting to receive reports from each remote system half. These reports were then evaluated to identify any malfunctions.

Once a malfunction was detected, the suspect remote system half and associated data path were taken out-of-service, and all normal communication services were provided by the in-service half utilizing the in-service data paths for the conveyance of all information. To pinpoint the actual cause of the problem in the suspect half, a very large number of additional diagnostic commands were conveyed by the central system to the suspect half over the inservice data path, and a corresponding number of replies were conveyed back to the central system over this inservice data path. This large number of additional reports and commands tended to clog the in-service path and inhibited the conveyance of normal information thereover.

It is an object of this invention to perform effective and thorough diagnostic operations on remotely situated duplicated communication units, minimizing the use of the in-service data path connecting these remote units to a controlling data processor, so that this data path can be utilized primarily for the conveyance of actual processing information.

SUMMARY OF THE INVENTION

A pair of duplicated communication system halves are remotely situated in relation to a controlling data processing unit. A distinct data path is provided between the data processing unit and each of the remote system halves for the conveyance of control information therebetween. When a remote communication system half malfunctions, that system half and its associated data path are placed in an out-of-service mode in which the circuits therein continue to operate, but the information derived by such circuits is not utilized for actual call processing.

In accordance with the principles of this invention, a diagnostic controller is provided at the remote location with the duplicated communication system halves. Responsive to a command from the processor received over the in-service data path, the controller autonomously simulates data received over the out-of-service data path and applies the simulated data to the malfunctioning communication system half. The malfunctioning communication system half then operates in its normal manner on the simulated data, as though it were actual data received over the out-of-service data path, and generates a test result based upon its operations in accordance with the simulated data. The diagnostic controller then compares the actual test result with an expected test result. A mismatch therebetween indicates an error condition. This error condition is reported by the controller to the processor over the in-service data path. Thus, the controller autonomously performs diagnostic operations at the remote location and the use of the in-service data path for conveyance of diagnostic reports is minimized.

More specifically, in accordance with this one illustrative embodiment of my invention, the diagnostic controller includes a memory for storing test vectors and expected responses. The test vectors are applied to the receiving portion of a data set to simulate normal commands received over the out-of-service data link. These test vectors are operated upon by the data set and conveyed to a signal distributor in the out-of-service half which generates appropriate commands to control trunks and operator positions. A scanner in the out-of-service half then detects changes in these trunks or operator positions and generates reports indicating detected changes. These reports are normally conveyed to the sending portion of the data set for conveyance over the out-of-service data link.

In accordance with an aspect of my invention, either the command generated by the signal distributor or the report generated by the scanner can be compared with an expected response stored in the diagnostic controller's memory to ascertain the validity of such command or report.

When a mismatch is detected a single report is generated by the diagnostic controller for conveyance over the in-service data link back to the controlling data processor to indicate the malfunction in the out-of-service half.

Even more specifically, in this one illustrative embodiment of my invention, the diagnostic controller's memory is a read-only memory in which instructions therefrom are extracted and executed in sequential order. To initiate the diagnostic routine, the controlling data processor only has to indicate the starting address for the routine and set a "start" flip-flop.

One group of instructions stored in the memory are mismatch reply words which are conveyed back to the data processor when a mismatch is detected. Each of these special instructions indicates the address at which the instruction itself is stored. Thus, for example, the mismatch reply word stored in address 32 also contains the designation 32. A special failure counter is provided to count the number of instructions executed by the diagnostic controller since the last reply word was sent to the controlling data processor. These reply words are sent to the data processor at specific points in the diagnostic routine to inform the processor that the routine is being run successfully and also to inform the processor of the addresses reached in the routine. When a mismatch is detected, rather than addressing the next instruction in normal sequential order, the contents of the failure counter are utilized to address memory. Thus, if 32 instructions were executed since the last reply word was sent, then the mismatch reply word stored at address 32 would be executed resulting in sending that instruction itself to the controlling data processor. Thus, the controlling data processor is able to ascertain the instruction at which the malfunction occurred merely by adding the number indicated by the received mismatch reply word to the address of the previously received reply word.

Thus, in accordance with an aspect of my invention, a special register is provided to count the number of instructions successfully executed since the last reply word was conveyed back to the controlling data processor, and when a mismatch is detected the contents of this register are utilized to address one of the mismatch reply words which itself indicates this count. Thus a complicated instruction transfer facility is not required and all instructions except for these mismatch instructions can be beneficially executed in sequential order.

In accordance with another aspect of my invention, timing means are provided to inhibit the diagnostic controller from sending mismatch reply words to the data processor at faster than a predetermined rate. Thus, even though numerous faults can be detected by the controller very rapidly, the controller itself inhibits the conveyance of these reports so that the single in-service data link does not become clogged with diagnostic reports.

In accordance with still another aspect of my invention, a special instruction (called the SPG instruction) is provided to interrogate a plurality of circuits such as trunk circuits, and all test vectors and expected responsed for these circuits are derived from the single instruction itself.

In accordance with another feature of my invention, when one data link is out-of-service, the diagnostic controller, in response to a command received over the inservice data link, simulates actual data received over the out-of-service data link and then compares the response of the out-of-service logic unit with an anticipated response. If a mismatch is detected, then an error report is conveyed over the in-service data link back to the controlling data processor.

BRIEF DESCRIPTION OF THE DRAWING

The foregoing as well as other objects, features, and advantages of my invention will be more apparent from a description of the drawing in which:

FIG. 3 illustrates a delay circuit and a shift pulse counting circuit;

FIG. 4 illustrates the failure counter and the address counter utilized to address memory;

FIG. 5 illustrates a clocking arrangement and phase signal generation logic utilized to control the flow of data in this embodiment;

FIG. 6 illustrates the read-only memory and some of the circuitry associated with the SPG instruction;

FIG. 7 illustrates the connections between the stored diagnostic controller and the data sets, scanners, and signal distributors in the remote trunk arrangement;

FIG. 8 illustrates the circuitry for receiving responses from the scanners and signal distributors, and apparatus for instituting comparisons between received responses and expected responses; and FIG. 9 illustrates logic apparatus for decoding the various types of instructions;

FIG. 10 illustrates the manner in which FIGS. 3–9 are to be arranged;

FIG. 11 illustrates the shape and timing of the phase signals generated by the phase counter illustrated in FIG. 5; and FIG. 12 indicates the format of the various instructions which are executed by the stored diagnostic controller.

GENERAL DESCRIPTION

Figure 1:
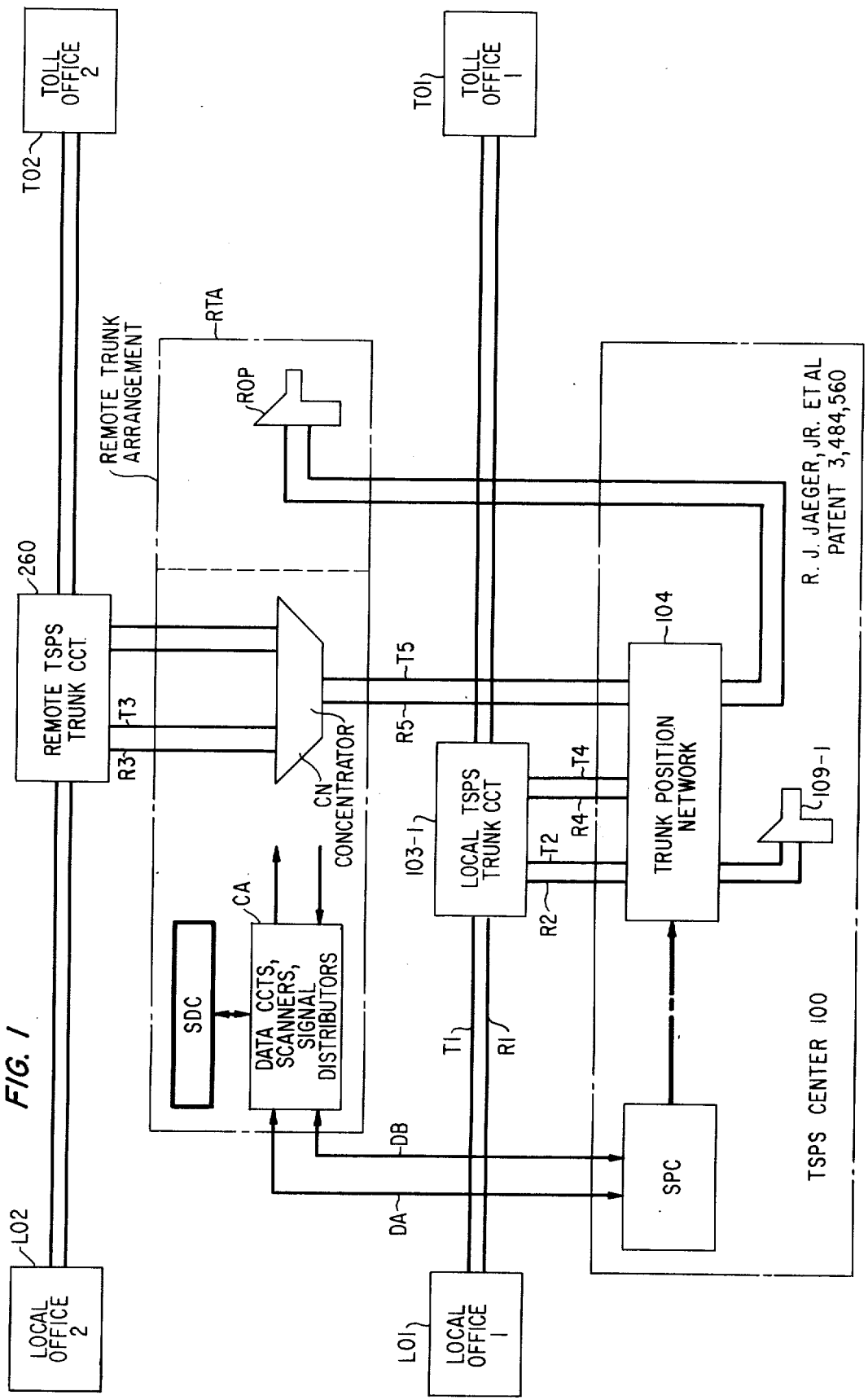
FIG. 1 illustrates in block diagram form the communication system in which this illustrative embodiment of my invention is utilized.

FIG. 1 illustrate in block diagram form a communication system in which this illustrative embodiment of my diagnostic arrangement is implemented. The overall purpose of the duplicated communication system is to provide automated service for certain types of telephone calls requiring operator assistance. The original system designed to automate many of the routine aspects of operator work is called the "Traffic Service Position System No. 1" (TSPS No. 1) and is depicted as TSPS Center 100.

To generalize the operation of Center 100, calls are received through local telephone switching office LO1 and connected to leads T1 and R1 extending to local TSPS trunk circuit 103-1. Communication is further established through circuit 103-1 over leads R2 and T2 to trunk position network 104. Leads R2 and T2 are then connected to operator's position 109-1 by network 104 under the control of data processing unit SPC. The operator associated with position 109-1 then talks to the calling party and indicates that, for example, a certain amount of money must be deposited in the calling coin station before the desired connection is established. After coin deposit, the number of the called station is then outpulsed through network 104 over leads R4 and T4 through circuit 103-1 to toll office TO1 which then establishes the connection to the called station. Trunk circuit 103-1 is then controlled to cut through leads T1 and R1 to toll office TO1 and the desired voice path is thereby established.

As mentioned previously, processor SPC controls the establishment of connections in network 104 and also controls the closure of contacts in circuit 103-1. Data processor SPC comprises duplicated processing units for performing logical and arithmetic operations in accordance with stored program instructions to control most aspects of TSPS Center 100. Processor SPC is comprehensively described in Vol. 49 of the *Bell System Technical Journal*, dated December 1970. TSPS Center 100 is extensively described in R. J. Jaeger, Jr. et al. U.S. Pat. No. 3,484,560, issued Dec. 16, 1969. All structure in TSPS Center 100 and also including circuit 103-1 correspond to its similarly designated counterparts in the above-specified patent.

TSPS No. 1 proved to be a highly effective system and substantially decreased the number of operators required to serve coin stations. However, the original system included certain limitations that sometimes created personnel difficulties. In particular, all trunk circuits and operator positions had to be located relatively close to the TSPS center. Accordingly, operators were forced to work in locations undesirable from a geographical standpoint.

In a first improvement in TSPS No. 1, additional circuitry was provided so that the operator positions could be remote from the main TSPS center; and accordingly, operator centers could be established in areas where sufficient number of operators were available. The remote operator positions were controlled utilizing carrier systems in which the control information was interspersed on a time division basis with the voice communication.

In this arrangement numerous diagnostic commands had to be conveyed over the in-service carrier to diagnose the remote out-of-service equipment. This tended to clog the in-service carrier and disrupted the provision of operator service.

In a second improvement as taught by A. E. Joel, Jr. U.S. Pat. No. 3,731,000, issued May 1, 1974, groups of TSPS trunk circuits could be located substantial distances away from the main TSPS center. Accordingly, it was then feasible to serve toll centers which were not large enough to support an entire TSPS complex by themselves. A concentrator switch was provided to connect the remote TSPS trunk circuits to the TSPS center, so that the number of voice paths to the TSPS center could be reduced. The concentrator switch was controlled based upon control information conveyed over the voice paths.

In a third improvement to the basic TSPS system as shown in the upper part of FIG. 1, the remote TSPS trunk circuits and operators' positions are located close to the same remote facility so that common control apparatus in the remote facility can be utilized to control both the operator' position and the establishment of connections through the remote trunk circuits and concentrator. In previous systems the control information was conveyed over the voice paths; however, in this arrangement called the remote trunk arrangement (or RTA), duplicated data links DA and DB which are distinct from the voice paths, are provided for conveyance of control information from the SPC.

Calls instituted through local office LO2 served by the RTA are provided the same high quality service that is provided to callers associated with local office LO1 which is served directly by TSPS center 100. More specifically, a call through local office LO2 is cut through a TSPS trunk circuit such as 260 to concentrator CN over leads R3 and T3 and then to trunk position network 104 via leads R5 and T5. Now the calling station can be connected by network 104 to one of the operator positions such as 109-1 associated with network 104 or to one of the operator positions ROP in the remote trunk arrangement. In fact, calls through local office LO1 can be handled by operators associated with the RTA. The RTA makes operator staffing much easier by affording a large amount of versatility to the user of the communication system.

This illustrative embodiment of my invention pertains to the utilization of stored diagnostic controller SDC to autonomously perform diagnostic operations on control circuitry CA in the RTA. This control circuitry comprises scanners, data circuits and signal distributors which communicate with the SPC over data links DA and DB. Controller SDC and this control circuitry will be shown in greater detail in ensuing figures. Diagnostic operations can also be performed autonomously on concentrator CN, positions ROP and Trunk circuits 260.

Trunk circuit 260 is substantially identical to trunk circuit 103-1 described in the above-mentioned Jaeger patent. Moreover, operator positions ROP are also substantially identical to those such as 109-1 in the Jaeger patent. A suitable concentrator CN is disclosed in A. F. Bulfer application Ser. No. 512,256, filed Oct. 4, 1974, now U.S. Pat. No. 3,935,394, issued Jan. 27, 1976. The communication over data links DA and DB is described in substantial detail in L. Caron application Ser. No. 479,891, filed June 17, 1974, now U.S. Pat. No. 3,927,392, issued Dec. 16, 1975.

Figure 2:
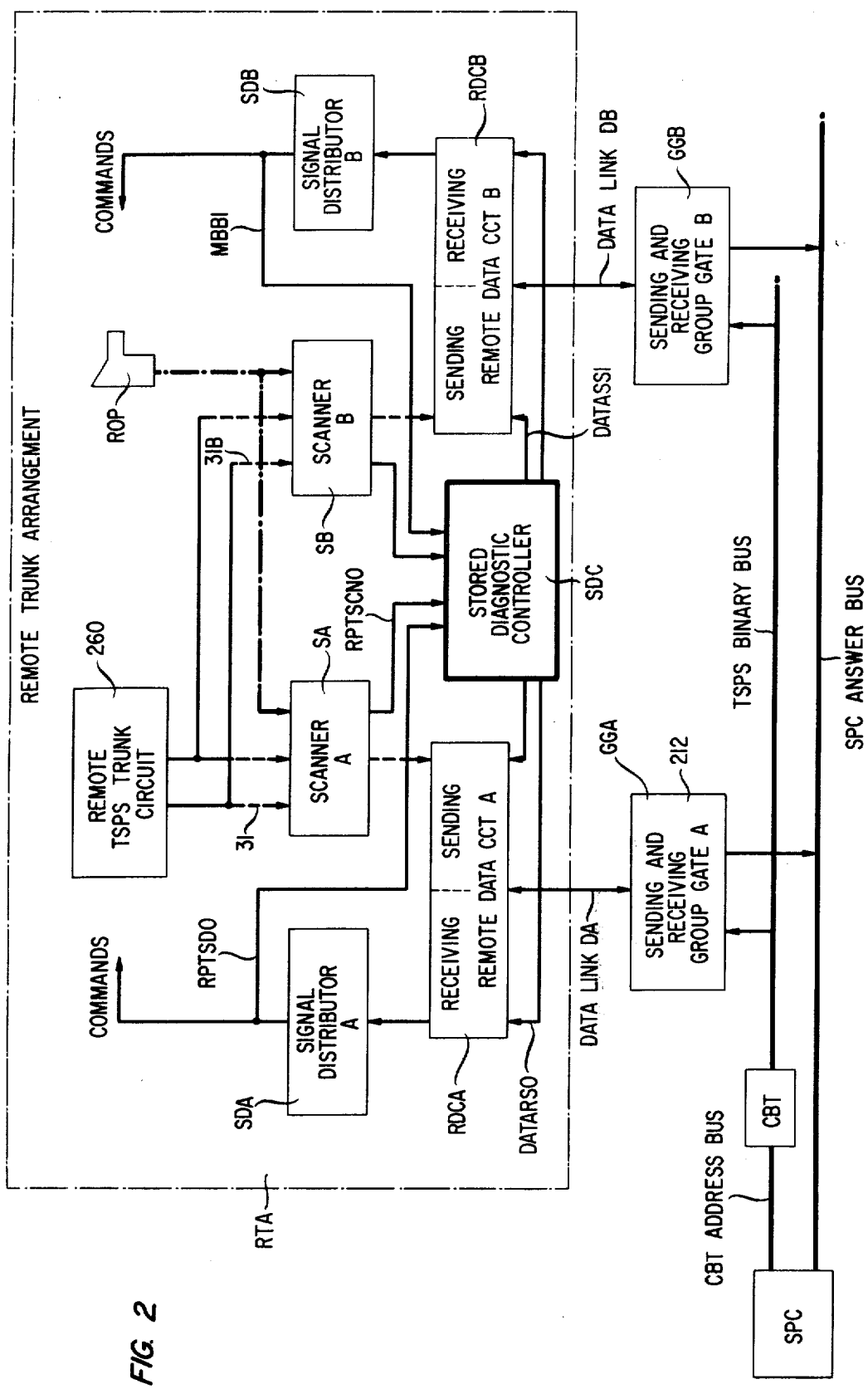
FIG. 2 illustrates in generalized form the control apparatus at the remote location (which is called the remote trunk arrangement) and the connections between the stored diagnostic controller and this apparatus.

FIG. 2 illustrates in greater detail the control circuitry for conveying control information between the SPC and the RTA. The various control circuits in the RTA are also illustrated. Basically, the SPC provides commands over the CBT address bus to communications bus translator CBT which decodes the orders and applies a translated order to the TSPS periphery units over the TSPS binary bus. The communication buses in the TSPS system and the operation of the CBT are described on page 2562 et seq., of the above-specified Dec. 1970 *BSTJ*. An order destined for the RTA is applied to sending and receiving group gate circuits GGA and GGB which then independently modulate and transmit the order over data links DA and DB respectively. This order is independently received by remote data circuits RDCA and RDCB. Circuits RDCA and RDCB respectively decode the order and match against one another to check for errors not detected by parity and cyclic code checks. If a correct match is obtained then this "active" RDC sends the order to its associated signal distributor. This signal distributor then actually generates an appropriate command to control circuitry in the RTA such as concentrator CN, remote TSPS trunk circuit 260, or operator's position ROP.

Most reports which are conveyed to the SPC originate in scanners SA and SB. These scanners are structurally identical and operate to synchronously scan a plurality of scan points in the remote trunk circuits and the remote operators' positions. Each scan point is multipled to each scanner over an input lead such as 31 or 31B. These input leads indicate the state of the associated scan point. These scanners are adapted to report only substantial changes of state such as those associated with seizures; disconnects; end of a dial digit; or operator service requests. These scanner reports are applied to the appropriate circuits RDCA or RDCB for transmission over links DA or DB to circuits GGA or GGB. A suitable scanner SA and SB is comprehensively described in D. J. Sassa application Ser. No. 499,122, filed Aug. 21, 1974, now U.S. Pat. No. 3,894,191, issued July 8, 1975.

In accordance with the principles of my invention, stored diagnostic controller SDC is provided in the remote trunk arrangement to autonomously diagnose either the A side equipment or the B side equipment responsive to commands from the SPC. More specifically, it will be assumed that data link DA and the associated A side circuitry such as signal distributor SDA, scanner SA, and remote data circuit RDCA are in an out-of-service mode in which the circuitry operates, but the information resulting from such operation is not utilized for actual call processing.

It will be further assumed that data link DB and the associated B side apparatus are in-service and actually performing call processing. To initiate a diagnostic operation to identify the failing circuitry in the A side, the SPC generates a first command indicating the address at which the diagnostic routine is to begin. This command is transmitted over data link DB to the receiving portion of remote data circuit RDCB where it is further applied to controller SDC over a set of leads, which are not illustrated. To actually start controller SDC, the SPC generates a second command which is conveyed over data link DB through circuit RDCB and is applied to signal distributor SDB. Responsive to this command, distributor SDB sets a maintenance buffer point over lead MBB1.

Controller SDC then autonomously begins the diagnostic routing at the specified starting address supplying only periodic updates to the SPC and also indicating any errors detected. More specifically, the first instruction executed is called an SPC reply word. This reply word indicates its own address and is utilized to inform the SPC that the SDC has begun its diagnostic routine at this address. To elaborate, the SPC reply word is conveyed over lead DATASS1 to the sending portion of remote data circuit RDC where it is modulated and conveyed over data link DB to processor SPC.

The second instruction which is normally executed is called a test vector and is utilized to simulate actual data received over data link DA. More specifically controller SDC applies this test vector over lead DATARSO to the receiving portion of data circuit RDCA. This test vector is further applied to signal distributor SDA which generates the appropriate commands to operate circuitry in an operator's position such as ROP or circuitry in a trunk such as trunk 260. Scanner SA is responsive to the change in such circuitry and reports this change to the sending portion of remote data circuit RDCA.

Furthermore, in accordance with the principles of this invention, the command from distributor SDA and the report from scanner SA are respectively conveyed back over leads RPTSDO and RPTSCNO to controller SDC.

The next command executed by the SDC is normally a comparison word which indicates the expected response from either the scanner, or the signal distributor. This expected response is compared with the actual received response with a mismatch indicating an error condition.

As mentioned previously, a failure counter is provided in the SDC to count the number of instructions executed since the last SPC reply word; and the number indicated by this counter is utilized to address the memory when a mismatch is detected. Assuming that a mismatch occurred, since the failure counter contains the number 2 (i.e., a test vestor instruction and a comparison instruction has been executed since the last SPC reply word) the SPC mismatch reply word, stored at address 2 is retrieved and conveyed over lead DATASS1 to the sending portion of remote data circuit RDCB for conveyance over data link DB to the SPC.

In accordance with a feature of my invention, the SPC merely adds the number indicated by the received mismatch reply word with the number indicated by the address of the last received reply word to ascertain the address at which the mismatch occurred.

In accordance with another aspect of this invention, delay instructions and timing means are provided to inhibit controller SDC from conveying reports over inservice data link DB at faster than a predetermined rate so that capacity on data link DB remains open for the conveyance of normal call processing information.

DETAILED DESCRIPTION

FIGS. 3 through 9 when arranged as shown in FIG. 10 illustrate the detailed structure of this one illustrative embodiment of my invention. To facilitate an understanding of the operation of this circuitry, a typical utilization of the depicted circuitry will be described. For this example, it will be assumed that data link DA is in an out-of-service mode and the circuitry associated with this A or 0 side will also be deemed out-of-service. Data link DB and the associated B or 1 side circuitry will be assumed to be in-service.

Figure 7:
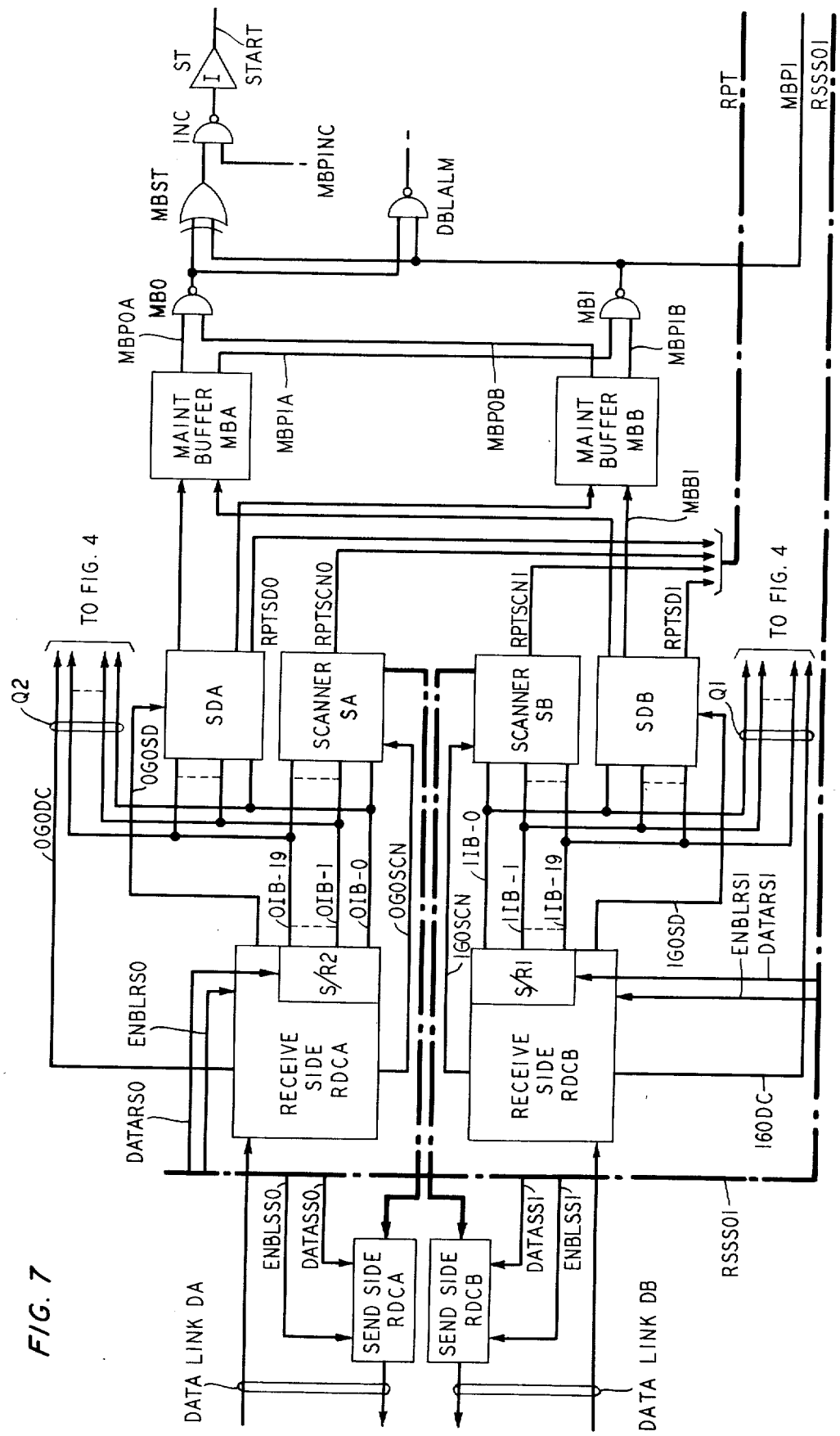

To initiate diagnostic operations by the SDC, processor SPC sends a first command over data link DB to the receive side of remote data circuit RDC shown in FIG. 7. This first command is demodulated into its original binary form and is loaded into shift register S/R1. The word in this shift register is decoded and the word itself indicates whether it is to be directed to a scanner, signal distributor or the SDC. Since this command is for the SDC, the receiver side of RDCB applies a LOW signal on lead 1GODC and the binary bits of the received command, which appear on leads 1IB0 through 1IB19 at the output of shift register S/R1, are applied over cable Q1 to the circuitry shown in the upper portion of FIG. 4. The LOW signal on lead 1GODC resets flip-flop BUSENA so that its 0 output is HIGH enabling gates 1Z1 through 1Z10 so that the binary bits applied via cable Q1 are applied to the input of 15-bit address counter AC through OR gates Z1A through Z10A. It should be noted that the first 5 bits of address counter AC are tied to ground so that the address counter can only be initialized to addresses divisible by 32. These first 5 bits, however, do form part of the normal counting process when the address counter is incremented. Although 20 bits are specified in the command from RDCB, only 10 bits are used to initialize counter AC.

It should be noted that if this first command had been received by the 0 side then, lead OGODC would have been LOW and gates 0Z1–0Z10 would have been utilized to gate the first command over cable Q2 from the receive side of remote data circuit RDC-A. Thus the SDC is adapted to receive information from either the A or B side, and is also adapted to perform diagnostics on either side.

Thus, the first command serves only to initialize the address counter to the address at which the diagnostic is to be run. Now a second command must be received from the SPC to actually start the SDC. Thus, a second command is generated by the SPC and conveyed over data link DB to the receive side of RDCB and is directed to shift register S/R1. This command is initially decoded in RDCB and it is ascertained that this command is destined for the signal distributor. Accordingly, a LOW signal is applied to lead 1GOSD to inform signal distributor SDB that is to receive the data word on leads 1IB-0 through 1IB-19. After receiving this data word, signal distributor SDB decodes the command and ascertains that it is an order to set a particular maintenance buffer. More specifically, two maintenance buffers MBA and MBB are provided, as shown in FIG. 7. These maintenance buffers serve to indicate where the 0 side or the 1 side is to be diagnosed. Each of the signal distributors has access to each of the maintenance buffers so that even if a signal distributor and a maintenance buffer fail, the other signal distributor can still set the proper maintenance buffer. Since the 0 or A side is to be diagnosed, signal distributor SDB applies a sequence at pulses over lead MBB1 to maintenance buffer MBB. This causes output lead MBPOB to go LOW. The other maintenance buffer outputs, namely, MBP0A, MBP1A, and MBP1B remain HIGH. Accordingly, the output of NAND gate MB0 goes from a LOW state to a HIGH state while the output of NAND gate MB1 remains LOW. Lead MBP1 remaining LOW indicates to the reset of the SDC that the 0 side is out-of-service, and, accordingly, the 1 side is in-service. Both inputs to EXCLUSIVE OR gate MBST are normally LOW so that the gate provides a LOW output. However, when the output of gate MB0 goes HIGH, the output of gate MBST goes HIGH. Lead MBPINC is normally HIGH and goes LOW only to prematurely terminate the operation of the SPC, which operation is not described herein. Responsive to its two HIGH inputs, NAND gate INC generates a LOW output which is inverted by gate ST to a HIGH signal on lead START. This HIGH signal on the START lead causes NAND gates SPGRPY and GPH7 in FIG. 5 to generate LOW outputs which are applied to reset leads R0 and R1 of counter PHS2 in phase counter PC. Counter PC comprises three individual integrated circuit counters PHS1, PHS2, and PHS3 which are connected in tandem so that the output of one counter serves as the input to the next counter. Counter PHS1 is responsive to a 1.0368 MHz square wave from a clock (not shown) which controls the entire remote trunk arrangement. The function of phase counter PC is to generate eight consecutive phase signals on leads PH0-PH7 respectively. These phase signals are illustrated in FIG. 11. Each of the phases contains a 7.7 $\mu s$ period in which the signal goes LOW and another 7.7 $\mu s$ period in which the signal goes HIGH before the beginning of the next phase. Thus with reference to the top line of FIG. 11, lead PH0 goes LOW for 7.7 $\mu s$ and then remains HIGH for the duration of the phase counting until of course phase zero is again reached. These 8 phase signals serve as the basic timing vehicle in the SDC and, as described hereinafter, serve to control the gating of data between constituent elements of the SDC.

Returning now to this example, when the R0 and R1 inputs to counter PHS2 go LOW, they remove the reset control from the counter, and phase counter PC begins operating for the first time.

The preceding has described how the SDC is initialized to start at a particular address, and then a maintenance buffer point is set to actually start the SDC by removing the reset control from phase counter PC.

The following description concerns how the first instruction is retrieved from memory and executed. More specifically, this instruction is an SPC reply word stored at the address indicated by address counter AC as initialized. This instruction is applied to the send side of remote data circuit RDCB and transmitted over link DB to inform the SPC that the SDC has begun operations at the address indicated in this reply word.

Figure 4:
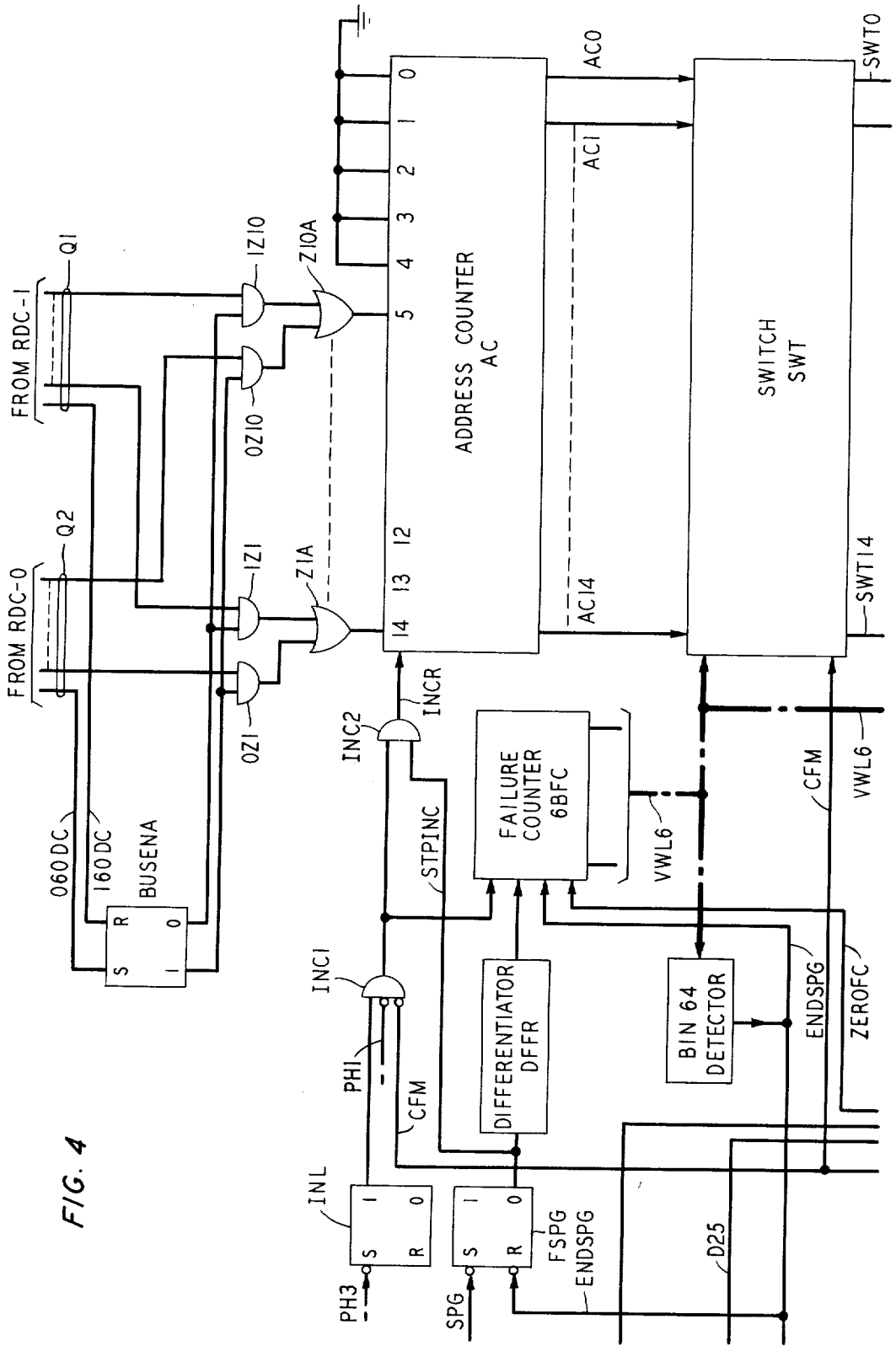

More specifically, during phase zero nothing significant occurs. During phase one, the signal on lead PH1 goes LOW and is inverted to a HIGH signal at the middle input lead of AND gates INC1 in FIG. 4. Normally the output of this gate goes HIGH during phase one so that gate INC2 also generates a HIGH pulse on lead INCR to increment address counter AC. Failure counter 6BFC is normally incremented by the HIGH signal from gate INC1. As described previously, the SDC does not utilize a transfer instruction and, accordingly, the address counter AC is normally incremented so that the instruction stored at the next sequential address is retrieved. However, for the first instruction, flip-flop INL in FIG. 4 is reset because phase 3 has not yet been reached. Thus the 1 output of this flip-flop is LOW inhibiting gate INC1 generating a HIGH output.

Figure 6:
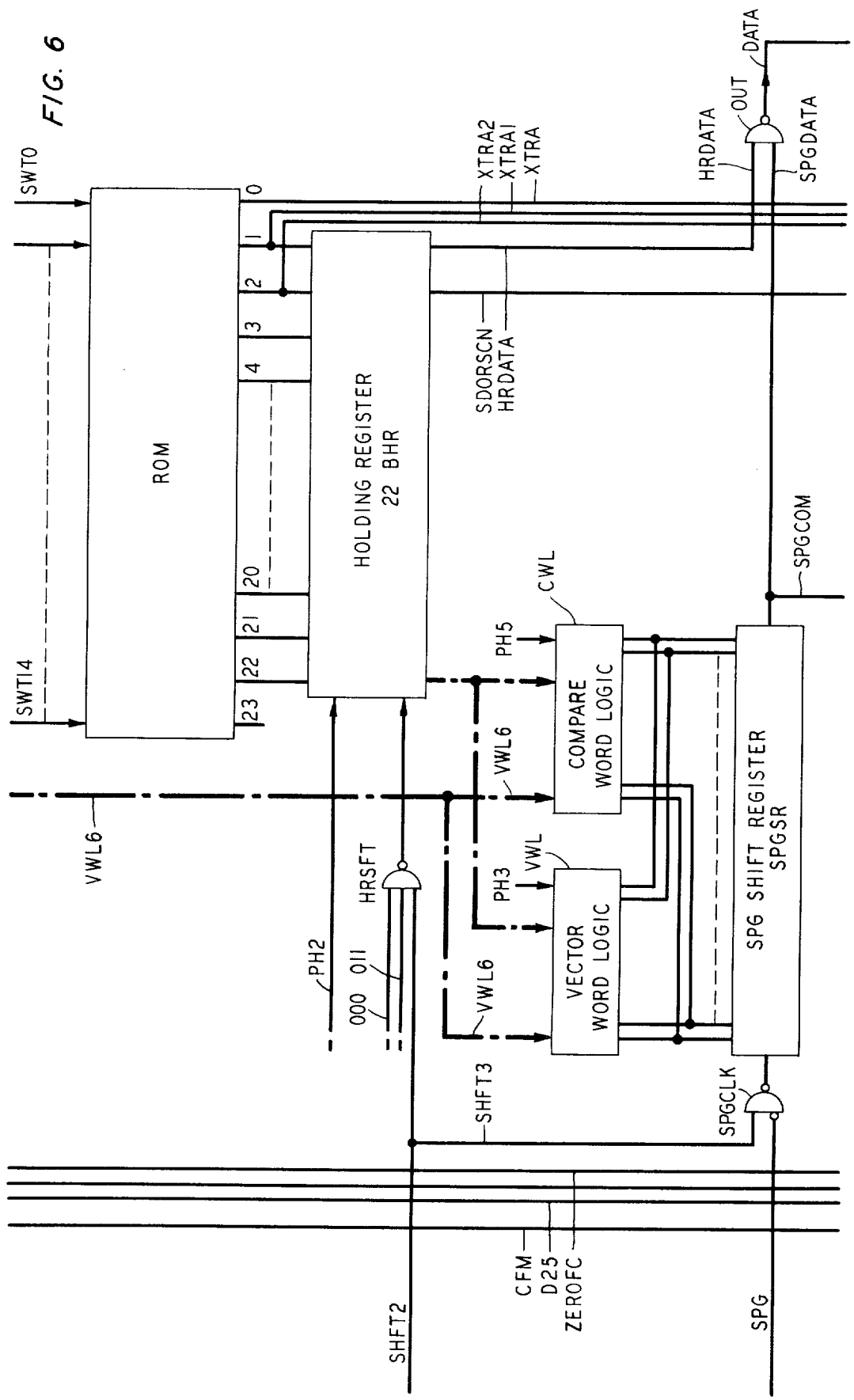

The first 64 words in read-only memory ROM in FIG. 6 are SPC mismatch reply words and are utilized to indicate that a malfunction has been detected by the SDC. More specifically, each of the words itself specifies the address at which the word is stored. Thus, the word stored at address 32 also contains the designation 32. As described below, this serves to indicate to the SPC, the number of words executed successfully since the last SPC reply word was sent. This figure will be described hereinafter in greater detail.

In this example, we will assume that address counter AC was initialized with address 65, this being the first address in which diagnostic sequences can be stored since the first 64 words are special mismatch reply words. Accordingly, 65 is output in binary form over leads AC0–AC14 through switch SWT over leads SWT0–SWT14 to memory ROM. Memory ROM is a well-known read-only memory and in this illustrative example, comprises several hundred storage locations. The word stored at address 65, is then applied over leads 0–23 from memory ROM. This word is an SPC reply word and is shown in the top line of FIG. 12. Bits 0–2 indicate the OP code of this instruction namely 111; and, in this example, bits 3–8 indicate in binary the address at which the instruction is stored, namely 65. Bit 22 indicates that this is the initial report, and bit 23 indicates the parity over the other bits. During phase 2 when lead PH2 goes LOW, 22 bits in this word are locked into holding register 22BHR in FIG. 6. This register serves to hold the retrieved word while it is executed. More specifically, the first three bits of the word which specify the OP code thereof are applied to decoder BCD in FIG. 9 over leads XTRA, XTRA1, and XTRA2. This decoder is a well-known binary-coded-decimal-to-decimal decoder which serves to decode the OP code of the retrieved word and generate a LOW signal on the corresponding output lead. Thus, normally all the outputs from decoder BCD and HIGH. Since the OP code 111 is now specified, decoder BCD generates a LOW signal on lead 111 indicating that an SPC reply word is specified. Inverter SPCRPY generates a HIGH output which is applied over lead ZEROFC and this HIGH signal operates to initialize failure counter 6BFC in FIG. 4 to an all 0 state. This failure counter counts the number of ROM words executed since the last SPC reply word and when a malfunction in the side being diagnosed is detected, the address indicated by this counter is utilized, instead of the address from the address counter AC to address memory ROM. The mismatch reply instruction, which is retrieved from one of the first sixty-four address locations is conveyed back to the SPC. At least every 64 executed words a normal SPC reply word is executed to inform the SPC of the progress of the diagnostic routine even if a malfunction is not detected.

Figure 9:
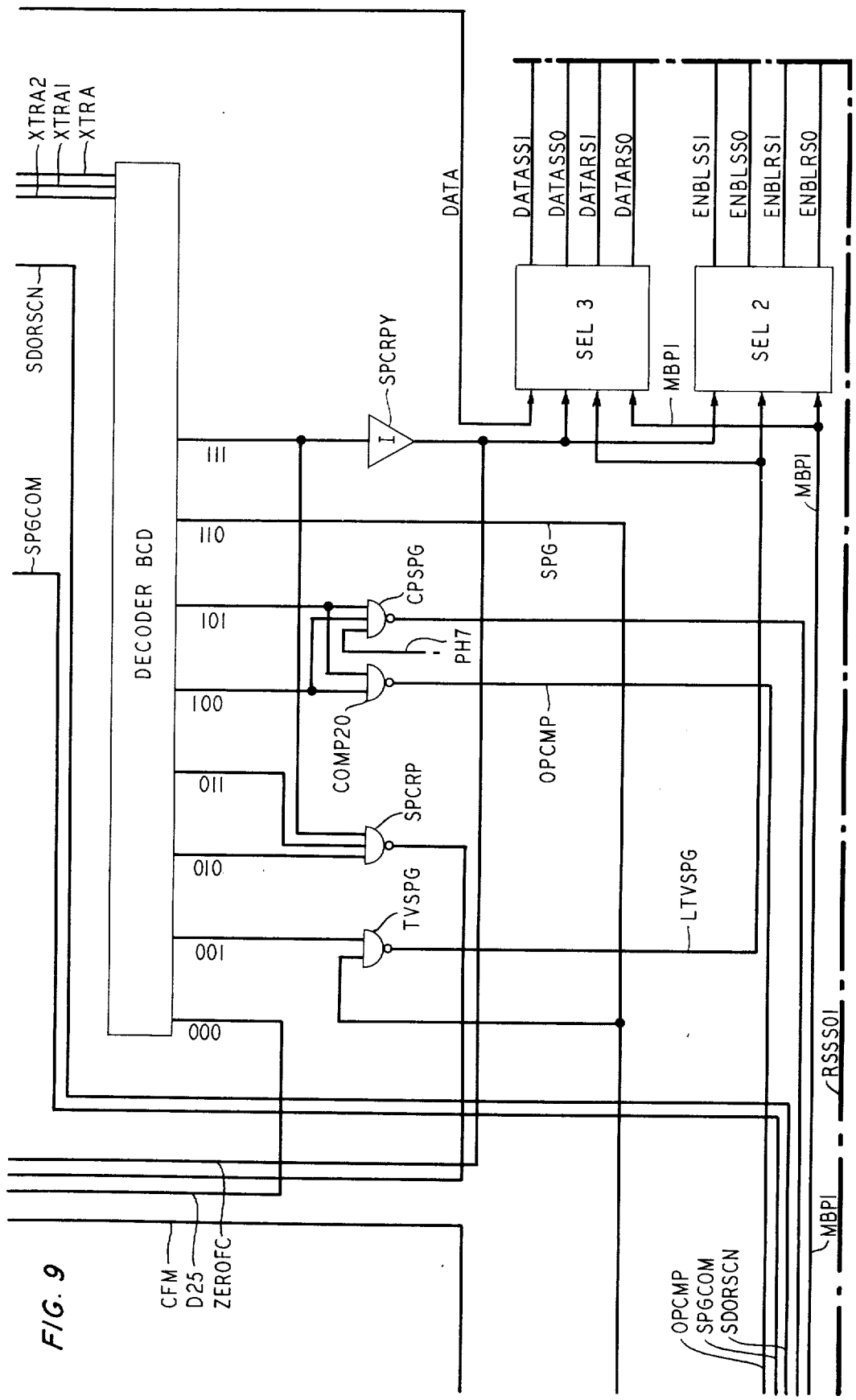

Returning to this example, the SPC reply word in the holding registers is shifted out and applied through selector SEL3 in FIG. 9 to send side of RDCB for conveyance back to the SPC. More specifically, the word in the holding register is serially gated out over lead HRDATA through NAND gate OUT (which follows the state of lead HRDATA since lead SPGDATA is normally HIGH) and over lead DATA to selector SEL3. Selector SEL3 is controllable to connect lead DATA to one of its four output leads namely DATASS1, DATASS0, DATARS1, or DATARS0. These four leads serve to direct data to either the receive side or send sides of either remote data circuit RDCA or RDCB. Selector SEL3 contains logic responsive to the output of inverter gate SPCRPY, and to the state of lead MBP1 which, as mentioned previously, specifies where the 1 side or the 0 side is to be interrogated. In this example, lead MBP1 is LOW since the 0 side is being interrogated. This selector is also responsive to the state of lead LTVSPG which indicates the output of NAND gate TV-SPG, as described hereinafter. The HIGH output from gate SPCRPY indicates that an SPC reply word is specified, and, therefore, the word to be applied over lead DATA must be conveyed to the send side of one of the remote data circuits. However, since the reply word can only be sent by the send side which is in-service, responsive to the LOW state of lead of MBP1, selector SEL3 connects the lead DATA to output lead DATASS1 which extends through cable RSSSO1 to the send side of remote data circuit RDCB in FIG. 7. Selector SEL2 in FIG. 9 is responsive to the same inputs as previously discussed in regard to selector SEL3 and serves to generate an enable signal on one of its four outputs, to indicate to the circuit which is to receive the word from selector SEL3 to accept that word. Thus, here lead ENBLSS1 goes HIGH to indicate to the send side of RDCB that it is to accept the data on lead DATASS1.

Figure 3:
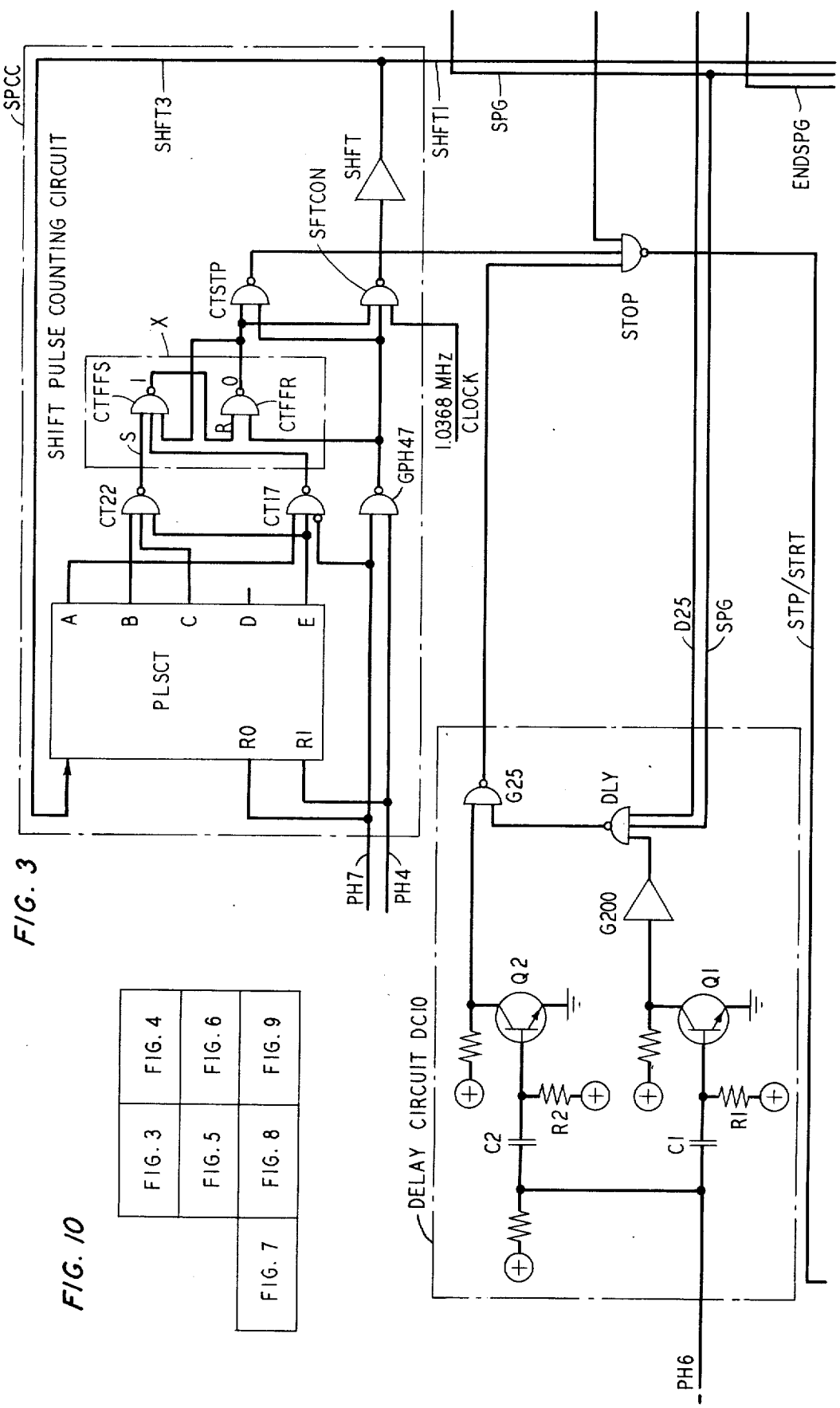
FIGS. 3 through 9, when combined as shown in FIG. 10, illustrate the detailed structure in this preferred embodiment of my invention and the specific connections between such circuitry and the apparatus in the remote trunk arrangement. More specifically.

The shift pulses which serve to gate out the word in holding register 22BHR to selector SEL3 are generated by shift pulse counting circuit SPCC in FIG. 3. These shift pulses are generated during phase four. When lead PH4 goes LOW, gate GPH47 generates a HIGH signal to unclamp flip-flop X comprising gates CTFFS AND CTFFR. The 0 output of this flip-flop is normally HIGH and thus when gates GPH47 also goes HIGH NAND gate SFTCON generates shift pulses responsive to the square wave from the 1.0368 MHz clock. These shift pulses are inverted by inverter SHFT and are applied over lead SHFT1 and over lead SHFT1 to NAND gate HRSFT in FIG. 6. Since leads 000 and 011 from decoder BCD are HIGH since neither of these OP codes is specified, gate HRSFT applies the shift pulses to holding register 22BHR to serially gate out the contents of the register over lead HRDATA to selector SEL3 as previously described.

During the shift pulse generation and counting operation of phase four, phase counter PC must be inhibited from going to phase five until the pulse generation operation is completed. To accomplish this, as long as flip-flop X in the shift pulse counting circuit is reset, gate CTSTP in FIG. 3 provides a LOW output and gate STOP, responsive to this LOW output, provides a HIGH signal on lead STP/STRT, which HIGH signal is applied to the reset leads of counter PHS1 in FIG. 5 and inhibits this counter from counting. This keeps counter PC in phase four. However, when flip-flop X is set as described below the output of gate CTSTP goes HIGH and the output of gate STOP also goes LOW removing the reset condition so that phase counting is resumed.

The shift pulses output from inverter SHFT in FIG. 3 are also applied over lead SHFT3 to counter PLSCT which is a six-stage binary counter. When lead PH4 went LOW as previously described this removed the reset condition on input R1 of the counter and the counter then began to count the applied shift pulses. Outputs A-E of the counter indicate in binary the number of counted shift pulses, output A being the least significant digit. When the count of 22 is reached, gate CT22 goes LOW to set flip-flop X. Thus the upper input of gate SFTCON goes LOW inhibiting the further application of shift pulses over lead HSFT1. When this occurs the contents of holding register 22BHR have been shifted out. When lead PH4 again goes HIGH during phase five, responsive to the HIGH states of leads PH4 and PH7, counter PLSCT initializes back to a count of 0 so that it can be utilized at a later time.

The preceding has described how the first word was retrieved from memory at address 65 and since it was an SPC reply word, the word itself (which contains the designation 65) was conveyed back to the SPC over data link DB. For this type of instruction, phases five through seven are not utilized.

TEST VECTOR

As mentioned previously, the SDC is adapted to retrieve and execute the words in ROM stored at successive addresses. At phase three of the preceding instruction, flip-flop INL in FIG. 4 was set so that at phase one of this next instruction gate INC1 in FIG. 4 generates a HIGH output to increment failure counter GBFC and gate INC2 also generates a HIGH output because lead STPINC is also HIGH. The HIGH signal on lead INCR increments address counter AC which now assumes the count of 66, which count is applied to memory ROM through switch SWT. At phase two, the ROM output is gated into holding register 22BHR. During phase three a parity check is performed over the output of memory to check for any error conditions. This circuitry is not shown here.

This new instruction is a signal distributor test vector which serves to simulate a command which normally would have been received over the out-of-service data link, which in this example is data link DA. As described in more detail hereinafter, this test vector is applied to the receive side of RDCA to simulate a command received over data link DA, and then it is further applied to signal distributor SDA which causes state changes in specific circuitry such as a trunk or position. Then scanner SA should detect the change in state of the altered circuit and provide a report of this change to the send side of remote data circuit RDCA.

In accordance with a feature of this invention, the command generated by the signal distributor can be compared with an expected command, or the report of the scanner can be compared with an expected report, or no comparison need be instituted at this time. The choice of the comparison or lack thereof is a part of the design and is predetermined by the type of and order in which instructions are stored in a memory ROM.

Returning now to this specific example, the bit structure of the retrieved test vector in holding register 22BHR is indicated on the second line of FIG. 12 wherein bits Z0–Z19 are the simulated data. The OP code of this instruction, namely 100 is applied to decoder BCD, in the same manner as previously discussed, and this decoder generates a LOW output over lead 100. The output of gate TV-SPG goes HIGH to indicate to selectors SEL2 and SEL3 that the test vector is to go to the receive side of side 0 or side 1, and the LOW state of lead MBP1 indicates that the 0 side is being diagnosed. Therefore these selectors will operate to convey information to the receive side of remote data circuit RDCA. More specifically, selector SEL3 connects lead DATA to lead DATARSO, and selector SEL2 generates a HIGH output on lead ENBLRSO to indicate to receive side of RDCA that it is to receive the data present on lead DATARSO, in a manner identical to that previously described in regard to the SPC reply word, counting circuit SPCC in FIG. 3 generates twenty-two shift pulses during phase four which operate to gate the test vector in holding register 22BHR through selector SEL3 to shift register S/R2 in the receive side of remote data circuit RDCA. Normally, instructions from the SPC received over data link DA are also directed into shift register S/R2 before conveyance to signal distributor SDA or scanner SA. Thus, the SDC simulates commands normally received over link DA.

In accordance with its normal operation during phase five, the receive side of RDCA decodes the information in its shift register and determines its destination and enables either lead OGODC, OGOSD, or OGOSCN depending upon the intended destination of the information. Here lead OGOSD is enabled informing signal distributor SDA that the information on leads OIB-0 through OIB-19 is directed thereto. This information on leads OIB-0 through OIB-19 respectively represents bits Z0 through Z19 in the test vector shown in FIG. 12.

The signal distributor further decodes the instruction in accordance with its normal operation and directs signals to a circuit or circuits identified by the instruction. These circuits, for example, may be trunks or positions and may serve to simulate that a scan point in a trunk has changed state. Such a simulation by the signal distributor and the resulting detection of such a simulation by a scanner is described in detail in Rigazio-Sassa application Ser. NO. 518,477, filed Oct. 29, 1974, now U.S. Pat. No. 3,912,881, issued Oct. 14, 1975.

To ensure that the signal distributor has sufficient time to operate upon the command directed thereto, during phase six a delay of 200 $\mu$s is generated during which time phase counter PC is inhibited from entering phase seven.

With reference to FIG. 3 when lead PH6 goes LOW, this drives the bases of transistors Q1 and Q2 negative with respect to their emitters thereby turning off the transistors. The input of inverter G200 goes HIGH and the inverter generates a LOW output which causes NAND gate DLY to generate a HIGH output. After approximately 200 $\mu$s as determined by the well-known time constant of capacitor C1 and resistor R1, transistor Q1 returns to conduction forcing the output of gate DLY to return to a LOW state. However, during the 200 $\mu$s period in which the output of gate DLY was HIGH, the output of gate G25 was LOW because transistor Q2 was also nonconductive and the upper input to gate G25 was HIGH. The output of gate STOP goes HIGH serving to keep counter PHS1 reset for the 200 $\mu$s period.

Figure 5:
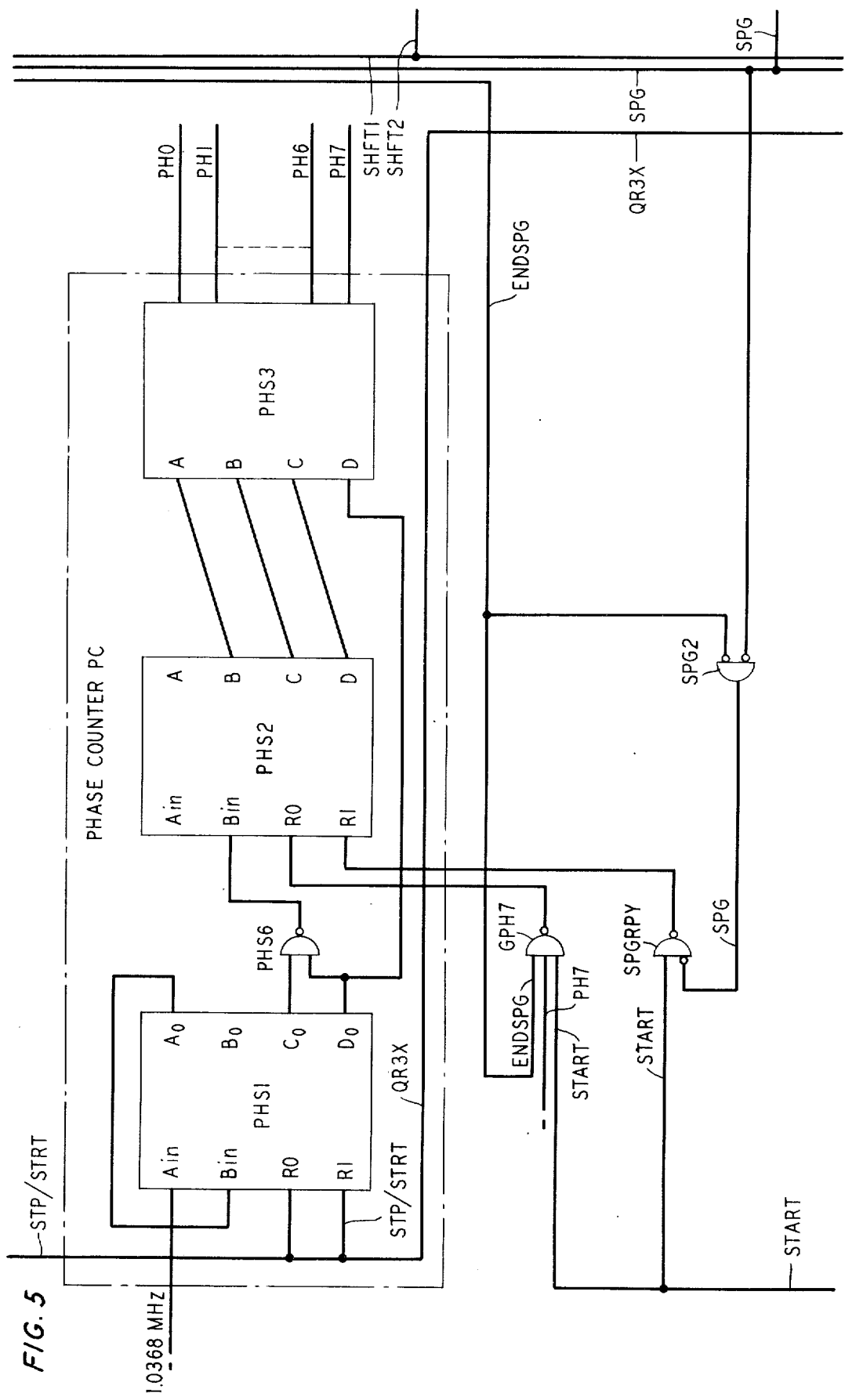

The instant that lead PH7 goes LOW at the start of phase seven, the output of gate GPH7 in FIG. 5 goes HIGH and resets the phase counter back to phase zero, since the output of gate SPGRPY is also HIGH at this time.

The preceding has described how the second instruction, a test vector, was retrieved from memory and applied to the output stage of the receive side of remote data circuit RDCA to simulate a command received over out-of-service data link DA. This command was then operated upon by signal distributor SDA to generate a change in state, which change was detected by scanner SA.

COMPARISON INSTRUCTION

During phase one, address counter AC and failure counter 6BFC are incremented as previously described; and during phase two the word stored at address 67 is gated into holding register 22BHR in the manner previously described. Also during phases one, two and three of this instruction and during the 200 $\mu$s delay of the preceding instruction, scanners SA and SB, and signal distributors SDA and SDAB load commands or reports into the four shift registers shown in FIG. 8 which are designated SD0, SCN0, SCN1, and SD1. To allow sufficient time for the scanners to detect the change in state and load these registers, it may be necessary in some embodiments to execute a 25 $\mu$s delay instruction prior to the comparison instruction. This delay instruction is described more fully hereinafter. Each of these shift registers is uniquely associated with one of the scanners or signal distributors. For example, shift register S/RSDO is associated with signal distributor SDA and receives commands therefrom over lead RPTSDO which is part of cable RPT. Normally, each of the scanners and signal distributors loads a report or command into the associated shift register. However, only one of these commands or reports is compared with an expected response found in the comparison word retrieved from memory ROM. For this example, it will be assumed that signal distributor SDA simulated a change of state in a trunk scan point which change was detected by scanner SA. Scanner SA then generated an approximate report which was applied to shift register S/RSCNO over lead RPTSCNO.

Figure 8:
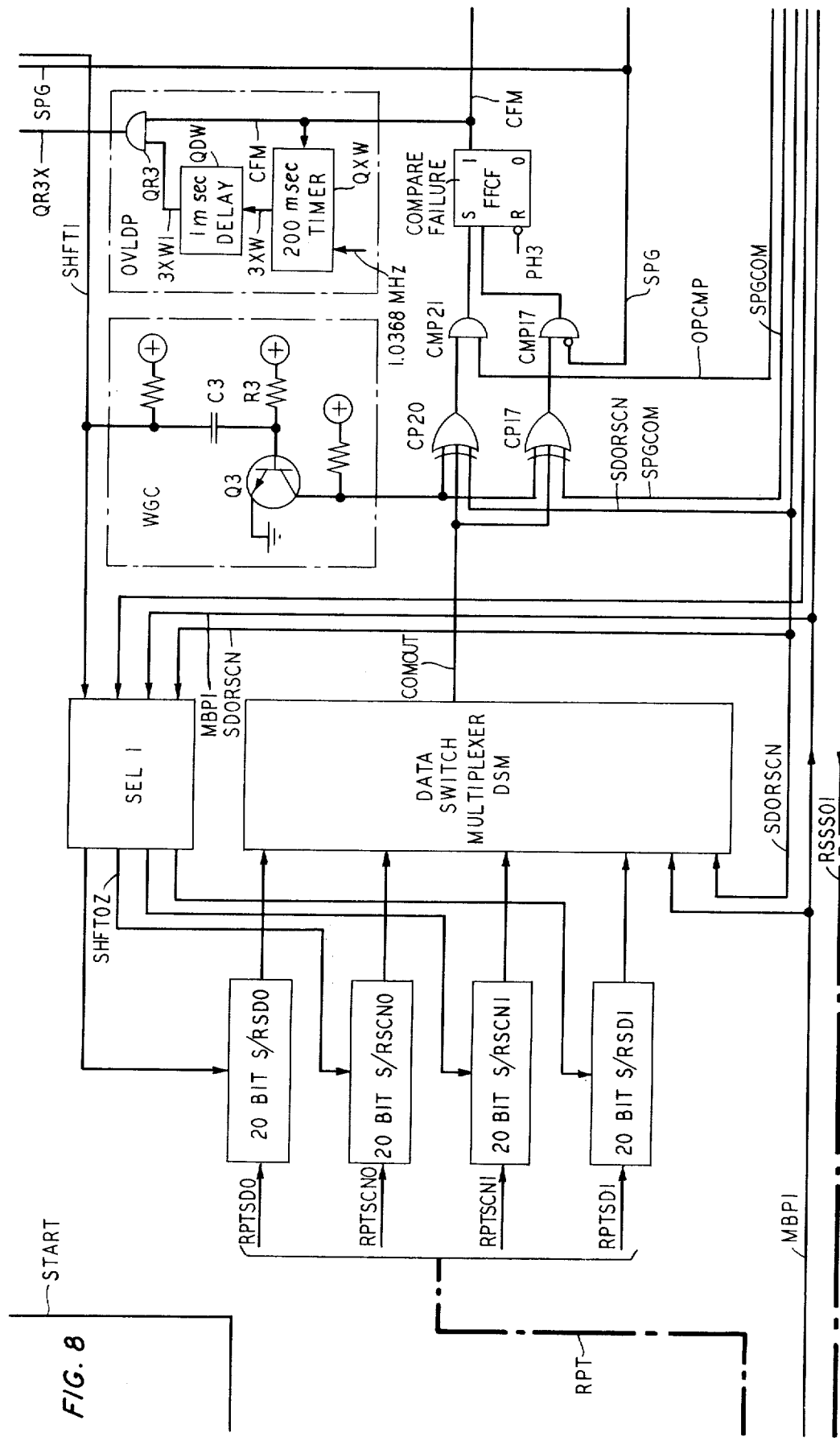

The comparison word now in holding register 22BHR has the format shown in the third line of FIG. 12 in which Z0–Z19 are 20 bits which indicate an expected scanner or signal distributor response. OP code 101 indicates that the expected report will be compared with the report from the signal distributor while OP code 001 indicates the expected report will be compared with the report from a scanner. For this example, we will assume that the OP code is 001. Accordingly, decoder BCD generates a LOW output on lead 001 and gate COMP20 in FIG. 9 generates a HIGH output on lead OPCMP which extends to gate CMP21 in FIG. 8. Selector SEL1 in FIG. 8 is utilized to selectively connect lead SHFT1 to one of its four outputs extending to the four shift registers. As mentioned previously, shift pulses are gated over lead SHFT1 from counting circuit SPCC in FIG. 3. Selector SEL1 chooses the shift register from which information is to be gated. Lead SDORSCN from holding register 22BHR is LOW because bit 2 is a 0 in this example and indicates to selector SEL1 that one of the two scanner shift registers is to be interrogated rather than one of the two registers associated with a signal distributor. Lead MBP1 specifies whether the 0 or 1 side shift registers are to be interrogated. Since leas MBP1 and SDORSLN are both LOW, selector SEL1 connects lead SHFT1 to output lead SHFTOZ.

Data switch multiplexer DSM is responsive to the same information as selector SEL1 and operates to connect the specific one of its four input leads to output lead COMOUT. Here multiplexer DSM connects lead GDO to output lead COMOUT because the response stored in register S/RSCNO is going to be gated out.

During phase four circuit SPCC in FIG. 3 applied shift pulses to lead SHFT1. These shift pulses are applied by selector SEL1 to lead SHFTOZ and further applied to shift register S/RSCNO. In response to the first shift pulse, the first bit in register S/RSCNO is applied over lead GDO which is connected to lead COMOUT by multiplexer DSM. Simultaneously, the first shift pulse on lead SHFT1 is applied over lead SHFT2 in FIG. 6 through gate HRSFT to holding register 22BHR. This register, responsive to this shift pulse, shifts its contents one-bit position to the right and applies the shifted bit (i.e., bit Z0 in FIG. 12) over output lead SDORSCN in FIG. 6 to EXCLUSIVE OR gate CP20 in FIG. 8. This gate operates to compare the bits from the holding register and shift register SCNO. Because there may be a slight time skew in the arrival of the bits to this EXCLUSIVE OR gate, circuit WGC in FIG. 8 is provided to compensate for this skew. This circuit generates a short enabling spike at the middle of each shift pulse and it is only during this short spike that EXCLUSIVE OR gate CP20 compares the bits.

Thus for each shift pulse applied over lead SHFT1, a corresponding bit in the holding register and in shift register S/RSCNO are compared. Thus the actual response from the scanner is compared with the expected response retrieved from memory. If a mismatch is detected, the output of gate CP20 goes HIGH, and since lead OPCMP is also HIGH (since OP code 001 is specified) compare failure flip-flop FFCF is set by the HIGH output of gate CMP21. This flip-flop, when set, indicates that a mismatch has occurred. The normal sequential accessing of instructions in memory ROM is now inhibited and an SPC mismatch reply word stored in an appropriate one of the first 64 memory locations is conveyed back to the SPC over the in-service data link, as described below. For the remaining phases of this instruction, no other significant events occur except during phase six the normal 200 µs delay is encountered.

SPC MISMATCH REPLY INSTRUCTION

Normally during phase one, gate INC1 in FIG. 4 generates a HIGH pulse to increment address counter AC so that memory ROM is accessed at the next consecutive address location. As mentioned previously, this HIGH pulse also serves to increment failure counter 6BFC in FIG. 4 which records the total number of instructions executed since the last SPC reply word was sent to the SPC. The failure counter is returned to an all zero count each time lead ZEROFC goes HIGH, which occurs for OP code 111 indicating an SPC reply word. Thus, the failure counter is normally incremented each time a new instruction is retrieved, but is returned to a count of zero when an SPC reply word is executed.

Since compare failure flip-flop FFCF in FIG. 8 is set, lead CFM is HIGH. The HIGH signal on this lead is inverted at the input of gate INC1 preventing the incrementing of either the failure counter or the address counter. Lead CFM also extends to switch SWT in FIG. 4. When this lead is HIGH, switch SWT gates the output of the failure counter 6BFC into memory ROM, rather than the count in address counter AC as is normal. Here the failure counter contains the number two in binary because two instructions have been executed by the SDC (i.e., test vector, and comparison) since the last SPC reply word. Thus the next word retrieved from memory ROM is the word stored at address two. As mentioned previously, each of the first 64 words is an SPC mismatch reply word which indicates its own address. The SPC can determine the address at which a mismatch occurred by adding the number indicated by the received mismatch reply words to the number indicated by the previously received normal SPC reply word, which is utilized to periodically inform the SPC of the SDC's progress. Thus in this example, the number indicated by the last SPC reply word was 65 and the number indicated by this SPC mismatch reply word was two. Accordingly, the SPC ascertains by adding these numbers, that the mismatch occurred at address 67.

To elaborate during phase two the ROM word at address two is gated into holding register 22BHR. The format of this word as shown in the fourth line of FIG. 12, is essentially identical to that of the normal SPC reply word shown at the top of FIG. 12, except that bits 3–22 indicate an address from one to 64, and here indicate the address two. This SPC mismatch reply word is executed by the circuitry just like a normal SPC reply word and is conveyed to the send side of remote data circuit RDCB in the manner described previously. More specifically, since lead 111 from decoder BCD in FIG. 9 is LOW, gate SPCRY generates a HIGH signal on lead ZEROFC, which signal serves to zero the failure counter so that for the next instruction the failure counter will be incremented to a count of one. At phase three, compare failure flip-flop FFCF in FIG. 8 is reset removing the HIGH signal on lead CFM. Thus, the next instruction will be retrieved from the incremented address of the address counter, namely 68, rather than from the count in the failure counter.

The SDC is adopted to detect mismatches at a rapid rate and to report these mismatches to the SPC over the inservice data link. If the interrogated portion of the RTA has suffered a severe failure, than a mismatch reply word could possibly be conveyed after each comparison instruction was executed. This might tend to overload the in-service data link with diagnostic reports and thereby interfere with normal call processing. To overcome this problem, circuitry is provided in accordance with a feature of this invention to prevent the SDC from conveying mismatch replies to the SPC at faster than 200 μs intervals. More specifically, after a mismatch is detected as described above, a 200 μs timer is started and the SDC executes the appropriate mismatch reply word and then continues with its normal sequential operations. However, if another mismatch is detected before this timer times out, then phase counter PC is inhibited from further counting until the end of the 200 μs period.

To elaborate, circuit OVLDP in FIG. 8 includes timer QXW which begins to time a 200 μs interval when lead CFM from compare failure flip-flop FFCF goes from a LOW to a HIGH state when a mismatch is detected. Lead 3XW is normally LOW but goes HIGH when timer QXZ begins timing. Delay circuit QDW delays the signal on lead 3XW for about 1 msec. During this 1 msec delay interval, flip-flop FFCF is reset at phase three of the next cycle so that lead CFM goes LOW and the output of gate QR3 remains LOW. However, if flip-flop FFCF is set before the 200 ms period has ended when another mismatch is detected, then leads CFM and 3XW1 will both be HIGH and gate QR3 will generate a HIGH output over lead QR3X to inhibit phase counter PC. Thus, until the end of this 200 ms period, the operation of the entire SPC is inhibited. However, at the end of this period, lead 3XW goes LOW and then 1 msec later lead 3XW1 goes LOW so that gate QR3 generates a LOW output and the normal operation of the SDC continues.

DELAY INSTRUCTION

Delay instructions are utilized to generate 25 ms delays which can be utilized for various functional reasons. For example, since the scanners require several scans to verify changes of state, a 25 ms delay may be required before the report of a scanner can be utilized. The format of these delay instructions is illustrated in FIG. 12. The OP code of these instructions is 000.

At phase one, address counter AC is incremented to count 68 and at phase two, the word stored at address 68 is gated into the holding register. Assuming now that this word is a delay word, decoder BCD causes lead 000 to go LOW, also causing lead D25 connected thereto to go LOW. This lead is connected to gate DLY in delay circuit DC10 in FIG. 3, and serves to override the effect of the 200 μs delay timing, previously described in regard to transistor Q1, capacitor C1 and resistor R1 by holding gate DLY output HIGH. Phases three, four and five are of no specific consequence in this instruction. However, at phase six, lead PH6 goes LOW causing transistor Q2 to stop conducting for a period of 25 ms as determined by the time delay induced by resistor R2 and capacitor C2. Thus, during this period, the upper input to gate G25 is HIGH; and as mentioned previously, the lower input is also HIGH because gate DLY is now controlled by the LOW on lead D25. Thus, for this 25 ms period, gate G25 generates a LOW output and responsive thereto gate STOP generates a HIGH output which operates to reset counter PHS1 so that phase counter PC remains in phase six for about 25 ms. At the end of this period, transistor Q2 begins to conduct and accordingly the output of gate G25 goes HIGH. The output of gate STOP then goes LOW removing the reset condition from the phase counter.

SPG SEQUENCE INSTRUCTION

The SPG sequence instruction is utilized to interrogate a group of 64 trunks. Thus, rather than having a separate test vector, delay, and comparison instruction for each of the trunks, a single instruction is utilized to interrogate all 64 trunks. To perform this feature, certain bits of the instruction are first combined to form the test vector. The failure couner 6BFC in FIG. 4 is used in this instruction and now serves to indicate which trunk in the group of 64 trunks is being interrogated. The bits of the failure counter are also included in each test vector and serve to identify the specific trunk whose state is being altered. The expected reply from the scanner is generated based upon the certain bits in the SPG sequence instruction itself as well as the failure counter bits.

More specifically during phase one, address counter AC is incremented to count 69. It is assumed that the word stored in memory at address 69 is a SPG sequence word and has the format illustrated in FIG. 12. This word is gated into holding register 22BHR during phase two. The OP code of the instruction is 011 so that lead 011 from decoder BCD goes LOW. This lead is also designated SPG and the LOW state of this lead sets flip-flop FSPG in FIG. 4. The 0 output of this flip-flop goes LOW and applies a LOW input to gate INC2 over lead STPINC to inhibit any further incrementing of address counter AC. Thus, for the next 64 instructions, address counter AC remains at address 69. Responsive to the HIGH-to-LOW transition of the 0 output of flip-flop FSGP, differentiator DFFR generates a HIGH output of short duration to zero failure counter 6BFC.

During phase three, vector word logic VWL in FIG. 6 outputs a binary test vector into SPG shift register SPGSR. This insertion is accomplished in accordance with the test vector mask shown in FIG. 12 to generate a 22 bit SPG test vector, where X1–X4 are the previously designated bits in the holding register, and bits F1–F6 represent the output of failure counter 6BFC, which output is received by logic VWL over cable VWL6. For this example bits F1–F6 are all zeros because the failure counter has just been set to a count of zero.

During phase four, counting circuit SPCC in FIG. 3 generates shift pulses in the normal manner over lead SHFT1. These shift pulses are further applied over lead SHFT2 to gate HRSFT in FIG. 6 and over lead SHFT3 to SPG shift register SPGSR. However, the pulses are not applied to the holding register because they are inhibited by NAND gate HRSFT because lead 011 is LOW. However, since lead SPG (same as lead 011) is LOW and this LOW signal is inverted at the input of gate SPGCLK in FIG. 6, this gate applies the shift pulses to SPG shift register SPGSR. The test vector is serially output bit-by-bit from register SPGSR over lead SPGDATA to gate OUT, which is responsive to this data since lead HRDATA is HIGH because the first bit in the holding register is a 1. Thus the test vector in register SPGSR is applied over lead DATA to selector SEL3. Since lead MBP1 is LOW, and since the output of gate TVSPG is HIGH (because lead 001 is LOW), the test vector is applied to the 0 side of the RTA and more specifically to the receive side of remote data circuit RDCA. In a similar manner, selector SEL2 responsive to the same information enables lead ENBLRSO so that the receive side of remote data circuit RDCA will accept the test vector. Thus, the information on lead DATA is applied by selector SEL3 to DATARSO and serially shifted into register S/R2 in FIG. 7. The word is further conveyed to signal distributor SDA which changes the state of trunk 000000 in the specified trunk group. This trunk is indicated by bits 7-12 of the SPG test vector shown in FIG. 12 in combination with the failure counter bits.

During phase five, compare word logic CWL in FIG. 6 is energized to apply the expected test result into SPG shift register SPGSR. The expected reply comprises 17 bits and has the format shown in the bottom line of FIG. 12, where F1–F6 represent the count from the failure counter received over cable VWL6.

During phase six, delay circuit DC10 in FIG. 3 generates a 25 ms delay signal which inhibits phase counter PC from going to phase seven during this time period. More specifically, lead SPG applies a LOW signal to gate DLY causing the 25 ms delay generated by resistor R2, capacitor C2, and transistor Q2 to be effective in an identical manner to that described previously in regard to the delay instruction.

During phase seven, gate SPGRPY in FIG. 5 responsive to the HIGH signal on lead START and the inverted LOW on lead SPG generates a LOW output so that counter PHS2 continues to count and phase seven does not terminate immediately, as normally occurs as described previously.

Now, during phase seven another set of shift pulses is generated by circuit SPCC in FIG. 3. However, now only seventeen pulses rather then twenty-two pulses are generated since gate CT17 in FIG. 3 is now responsive to counter PLSCT reaching the count of seventeen because its lower input as inverted is HIGH since lead PH7 is now LOW. Thus at a count of seventeen, gate CT17 goes LOW setting flip-flop X and terminating shift pulse generation. These pulses are directed over leads SHFT1 and SHFT3 to register SPGSR, in a manner identical to that previously described.

Responsive to these shift pulses, the expected response is output from register SPGSR over lead SPGCOM to EXCLUSIVE OR gate CP17 in FIG. 8. These shift pulses are also applied over lead SHFT1 to selector SEL1 in FIG. 8 and directed to the appropriate shift register. The shift pulses in this example are applied to shift register S/RSCNO via lead SHFTOZ. This register was previously loaded with a report from scanner SA over lead RPTSCNO in a manner previously described.

Multiplexer DSM in FIG. 8 applies the gated-out serial data received over lead GDO from shift register S/RSCNO to lead COMOUT in the manner previously described. The data is then applied to EXCLUSIVE OR gate CP17 where it is compared with the gated-out expected response from SPG shift register SPGSR. Since lead SPG is LOW, gate CMP17 is energized to detect mismatches indicated by gate CP17 and operates to set compare failure flip-flop FFCF if a mismatch occurs. If a mismatch is detected, this flip-flop is set and, instead of executing the next portion of the SPG instruction, an SPC mismatch reply word is transmitted in a manner identical to that previously described. Normally an SPC reply word is executed just prior to each SPG sequence instruction so that the count in the failure counter utilized to access the next instruction serves to indicate where in the SPG instruction a mismatch was detected.

At the end of phase seven, phase counter PC starts with phase zero again. At phase one, failure counter 6BFC is incremented to a count of one but address counter AC is not incremented so that the same SPG instruction is reinserted in the holding register.

Thus 63 more test vectors are applied to out-of-service side 0 and the corresponding scanner reports are compared with expected responses.

Finally, failure counter 6BFC reaches a count of 64 which is detected by detector BIN64. This detector then generates a LOW output on lead ENDSPG which resets SPG flip-flop FSPG in FIG. 4 and also resets failure counter 6BFC to all zeros. This LOW on lead ENDSPG is also applied to gate GPH7 in FIG. 5 which, in response thereto, applies a HIGH output to input R0 of counter PHS2. Gate SPG2 in FIG. 5 generates a HIGH output responsive to its two HIGH inputs as inverted. Gate SPGRPY then generates a HIGH output which is applied to input R1. The two HIGH inputs (R0 and R1) together operate to reset phase counter PC to phase zero so that a new instruction is retrieved from memory. To elaborate, since flip-flop FSPG is reset, address counter AC is incremented in the normal manner and the instruction stored at address seventy is now extracted and executed.

To terminate the operation of the SDC, the SPC resets maintenance buffer MBB, so that lead START goes LOW inhibiting phase counter PC.

What is claimed is:

1. In a system wherein a first and second remote logic unit respectively communicate with a local controlling logic unit over first and second data paths, a diagnostic controller in physical proximity to said remote logic units for diagnosing said first remote logic unit when said first data path is out-of-service and said second data path is in-service, comprising means responsive to informtion received over said in-service data path from said controlling logic unit for generating test data and applying said test data to said remote first logic unit to simulate data received over said out-of-service data path, means responsive to said first remote logic unit's operations on said test data for detecting malfunctions in said first remote logic unit, and means controlled by said detecting means for reporting any detected malfunctions over said in-service data path to said controlling logic unit.

2. The diagnostic controller in accordance with claim 1 wherein said information received from said controlling logic unit specifies an address, and wherein said generating and applying means comprises an addressable memory storing said test data, means responsive to said information received from said controlling logic unit for retrieving a test vector from said memory at an address related to said specified address, and means for applying said retrieved test vector to said first remote logic unit to simulte data received over said out-of-service data path.

3. The diagnostic controller in accordance with claim 2 wherein said first remote logic unit operates in accordance with said retrieved test vector applied thereto and generates a response, and wherein said memory also stores an expected response, and wherein said detecting means comprises means for controlling said retrieving means to retrieve said expected response from said memory, means for comparing said retrieved expected response with said response from said first remote logic unit, and means responsive to said comparing means for generating an error signal if a mismatch is detected between said compared responses.

4. The diagnostic controller in accordance with claim 3 wherein said memory also stores malfunction reports and wherein said reporting means comprises means for controlling said retrieving means to retrieve a malfunction report from said memory, and means for transmitting said retrieved malfunction report over said in-service data path to said controlling logic unit.

5. The diagnostic controller in accordance with claim 4 wherein said memory also stores progress reports and wherein said expected response controlling means controls said retrieving means to retrieve a progress report from said memory, and wherein said report transmitting means also transmits said retrieved progress report over said in-service data path to said controlling logic unit.

6. In a communication system wherein a pair of logic units are remotely situated in relation to a controlling data processing unit, and wherein each of said logic units communicates with said processing unit over a distinct data path associated therewith; apparatus for diagnosing one of said logic units when the one data path associated therewith is not deemed fully operational, which comprises means responsive to information from said processing unit received over the other of said data paths for generating test information and for applying said generated test information to said one logic unit to simulate information received over said one data path, said one logic units being responsive to said applied test information for operating in accordance therewith and generating a response thereto, means for providing an expected response, means for comparing said generated response with said expected response, means responsive to said comparing means for generating an error signal if a mismatch is detected, and means responsive to said error signal for generating an error indication and for transmitting said error indication to said processing unit over said other data path.

7. The apparatus in accordance with claim 6 wherein said generating and applying means comprises a memory storing test information, means for addressing said memory at an address specified by said information from said processing unit to retrieve said test information therefrom, register means for temporarily storing said retrieved test information, gating means controllable to gate said retrieved test information from said register means to either of said logic units, and means responsive to said information from said processing unit for controlling said gating means to gate said retrieved test information to said one logic unit.

8. The apparatus in accordance with claim 7 wherein said memory also stores said expected response, wherein said providing means comprises means for controlling said addressing means to retrieve said expected response from said memory, and wherein said comparing means comprises first register means for temporarily storing a response from said one logic unit, second register means for temporarily storing a response from the other of said logic units, a comparator, gating means controllable to gate said retrieved expected response to said comparator and controllable to gate the response stored in either of said first or second register means to said comparator, and means responsive to said information from said processing unit for controlling said last-named gating means to gate said retrieved expected response and the response in said first register to said comparator.

9. The apparatus in accordance with claim 8 wherein said memory also stores said error indication, and wherein said generating and transmitting means comprises means for controlling said addressing means to retrieve said error indication from said memory, and means for applying said retrieved error indication to said other logic unit, said other logic unit being operative to transmit said applied retrieved error indication to said processing unit over said other data path.

10. In a communication system wherein a pair of communication units are remotely situated in relation to a controlling data processing unit and wherein each of said communication units communicates with said processing unit over a distinct data path uniquely associated therewith, apparatus for diagnosing one of said communication units when the one data path associated therewith is out-of-service, comprising a memory for storing test vectors, expected responses, and reply words, retrieving means responsive to information from said data processing unit received over the other of said data paths for retrieving a test vector and an expected response from said memory, means for applying said retrieved test vector to said one communication unit to simulate data received over said one data path, said one communication unit being operative in accordance with said applied test vector and generating a response thereto, means for comparing said retrieved expected response with said generated response, means responsive to said comparing means for generating an error signal if mismatch is detected, means responsive to said error signal for controlling said retrieving means to retrieve a reply word from said memory, and means for transmitting said retrieved reply word to said processing unit over said other data path.

11. The apparatus in accordance with claim 10 wherein said memory is a read-only memory, and wherein said retrieving means comprises an address counter indicating the address of the next instruction to be retrieved from said memory, means for setting said address counter to a starting address having a predetermined relation to an address indicated by said information from said data processing unit, and means for incrementing the address in said address counter.

12. The apparatus in accordance with claim 11 wherein said controlling means comprises register means responsive to said incrementing means for indicating the number of instructions retrieved from said memory, and means responsive to said error signal for inhibiting the application of said address indicated by said address counter to said memory and for applying to said memory an address having a predetermined relation to the number indicated by said register means.

13. In a communication system wherein a pair of logic units are remotely situated in relation to a controlling data processing unit, and wherein each of said logic units communicates with said processing unit over a distinct data path associated therewith, and wherein one of said logic units and the one data path associated therewith are out-of-service, diagnostic apparatus comprising a source of test vectors, applying means responsive to information received from said data processing unit over the other data path for applying a plurality of said test vectors in a predetermined sequence to said one logic unit to simulate data received over said one data path, said logic unit being operative in accordance with each of said test vectors applied thereto and generating a response for said each test vector, a source of expected responses, means for comparing each said generated response with an expected response and for generating an error signal if a mismatch is detected, means responsive to said error signal for transmitting an error indication to said processing unit over said other data path, timing means controlled by said error signal for timing a predetermined interval of time, means responsive to said timing means for inhibiting said transmitting means for transmitting any more error indications to said processing unit for said predetermined time interval.

14. In a communication system wherein a pair of logic units are remotely situated in relation to a controlling data processing unit and wherein each of said logic units includes a signal distributor and communicates with said processing unit over a distinct data path associated therewith, apparatus for diagnosing one of said logic units and the ability of the signal distributor therein to generate commands when the data path associated with said one logic unit is out-of-service, comprising a counter set to predetermined count and indicating the count thereof, a memory storing an instruction, means for retrieving said instruction, first logic means responsive to said indicated count and to said retrieved instruction for generating a test vector, means for applying said test vector to said one logic unit to simulate data received over said out-of-service data path, said signal distributor in said one logic unit generating a command responsive to said applied test vector, second logic means responsive to said indicated count and to said retrieved instruction for generating an expected command, means for comparing said generated command with said expected command, means responsive to said comparing means for generating an error signal if a mismatch occurs, and means responsive to said error signal for transmitting an error indication to said processing unit over said other data path.

15. The diagnostic apparatus in accordance with claim 14 further comprising means responsive to the absence of said error signal for incrementing said counter and wherein said first logic means is responsive to said incremented count and said retrieved instruction for generating another test vector and said second logic means is responsive to said incremented count and said retrieved instruction for generating another expected command, whereby the successive incrementation of said count causes the generation of a plurality of test vectors and expected commands.

16. For use in a telephone system providing operator services wherein first and second duplicated control units are remotely situated in relation to a controlling data processing unit, and wherein a first data path is connected between said first control unit and said processing unit for the transmission of data therebetween, and a second data path is connected between said second control unit and said processing unit for the transmission of data therebetween, each of said control units comprising (1) a data set for receiving and transmitting data over the data path connected to said each control unit, (2) a scanner for scanning a plurality of trunks and operator positions and providing reports to said data set, and (3) a signal distributor responsive to data received by said data set for controlling said trunks and positions; a diagnostic controller for diagnosing said first control unit when said first data path is out-of-service and said second data path is in-service, which comprises a memory for storing a plurality of diagnostic instructions, means responsive to information from said controlling data processing unit received over said second data path by the data set in said second control unit for retrieving a first diagnostic instruction from said memory, means for decoding each instruction retrieved from said memory, means responsive to said decoding means for applying at least a portion of said first instruction to said data set in said first control unit to simulate data received over said first data path, said first control unit being operative in accordance with said first instruction, said signal distributor therein generating a command, and said scanner therein generating a report, first means for controlling said retrieving means to retrieve a second instruction from said memory, means responsive to said decoding means for comparing information specified by said second instruction with either said generated report or said generated command, means connected to said comparing means for generating an error signal if a mismatch is detected, second means responsive to said error signal for controlling said retrieving means to retrieve a third instruction from said memory, and means responsive to said decoding means for applying at least a portion of said third instruction to said data set in said second control unit for conveyance to said controlling data processing unit over said second data path.

17. The diagnostic controller in accordance with claim 16 wherein said second controlling means controls said retrieving means to retrieve said third instruction from said memory at an address having a predetermined relationship to the number of instructions retrieved from said memory.

18. The diagnostic controller in accordance with claim 16 wherein said first diagnostic instruction is retrieved from said memory at an address indicated by said information from said controlling data processing unit.

19. The diagnostic controller in accordance with claim 16 wherein said comparing means comprises a comparator, first gating means for gating said information specified by said second instruction to said comparator, second gating means selectively controllable to gate either said generated report or said generated command to said comparator, and means responsive to said decoding means decoding said second instruction for controlling said second gating means.

* * * * *

UNITED STATES PATENT AND TRADEMARK OFFICE
CERTIFICATE OF CORRECTION

PATENT NO. : 3,958,111
DATED : May 18, 1976
INVENTOR(S) : John A. Hackett

It is certified that error appears in the above—identified patent and that said Letters Patent are hereby corrected as shown below:

Column 3, line 64, "responed" should read --responses--.
Column 4, line 53, "illustrate" should read --illustrates--.
Column 5, line 68, "operator' position" should read --operators' positions--. Column 7, line 48, "routing" should read --routine--. Column 8, line 57, "receiver" should read --receive--. Column 9, line 44, "reset" should read --rest--. Column 10, line 21, after "this" insert --first--. Column 11, line 12, "and" should read --are--. Column 12, line 8, "gates" should read --gate--; line 12, "SHFT1" (second occurrence) should read --SHFT2--. Column 14, line 56, "25 µs" should read --25 ms--. Column 15, line 30, "leas" should read --leads--; line 35, "specific" should read --specified--; line 40, "applied" should read --applies--. Column 17, line 16, "200 µs" should read --200 ms--; line 22, "200 µs" should read --200 ms--; line 24, "200 µs" should read --200 ms--. Column 18, line 20, "couner" should read --counter--. Column 20, line 67, "simulte" should read --simulate--. Column 23, line 49, "for" should read --from--.

Signed and Sealed this

Twelfth Day of October 1976

[SEAL]

Attest:

RUTH C. MASON
Attesting Officer

C. MARSHALL DANN
Commissioner of Patents and Trademarks